May 20, 1952 — T. R. MAHONEY — 2,597,742
ROTARY HOE WHEEL
Filed July 19, 1948
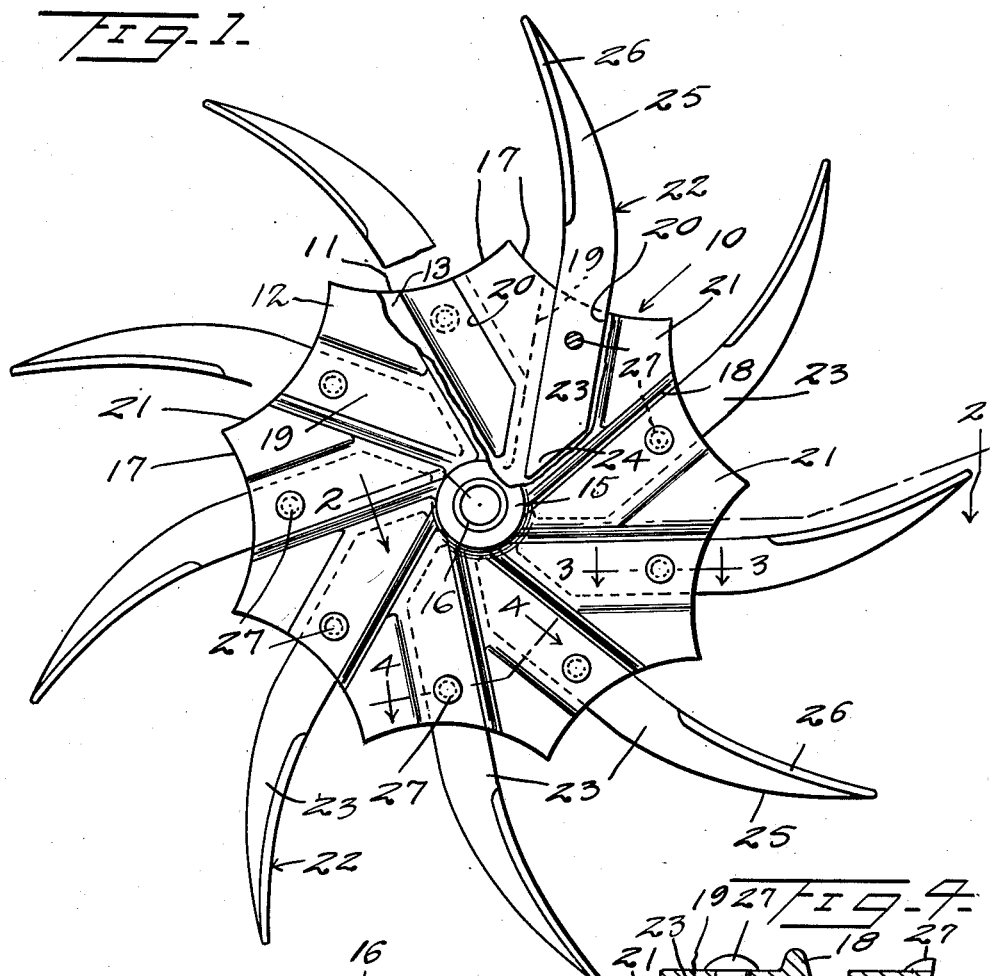
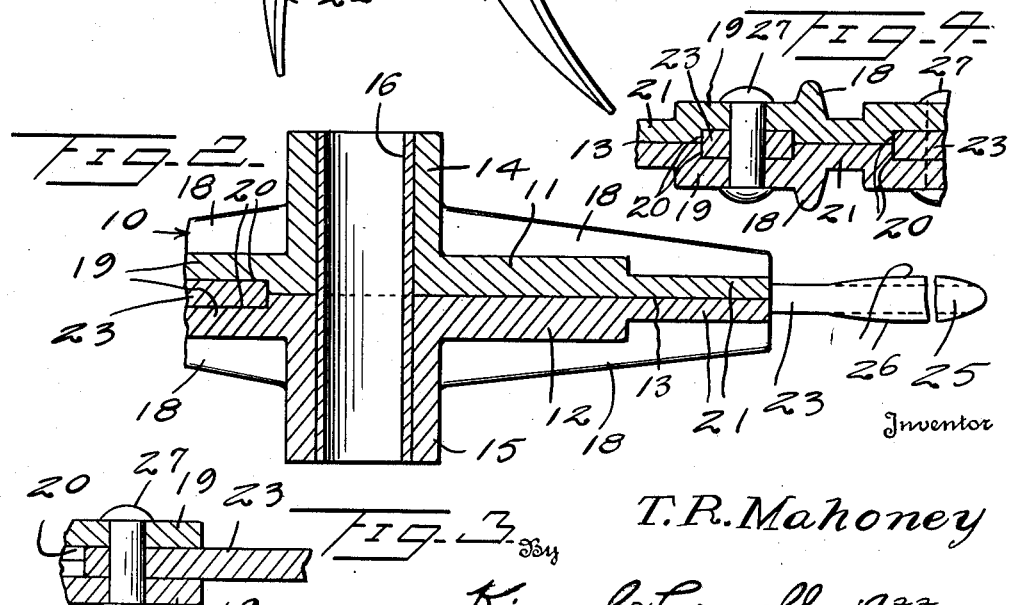

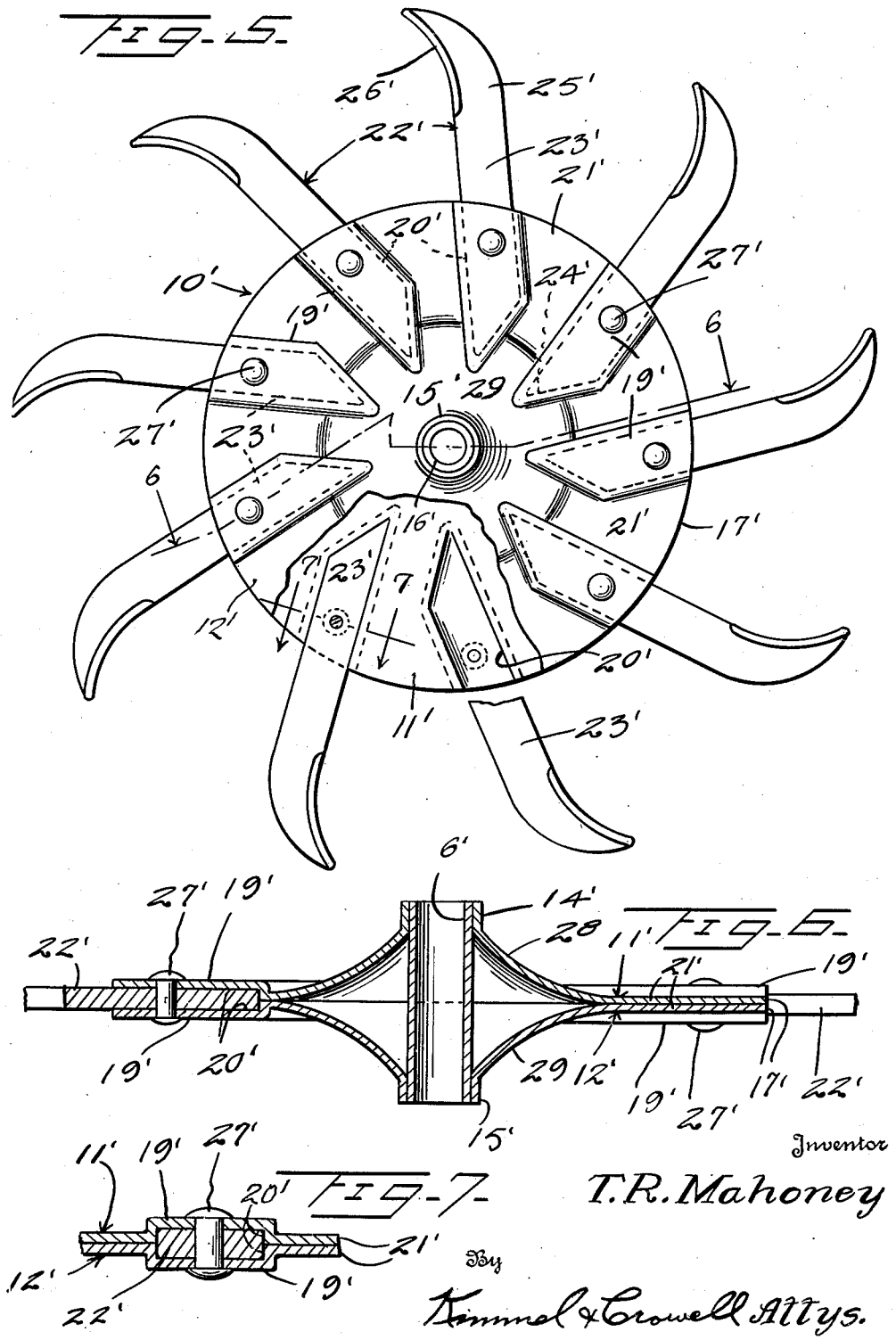

Patented May 20, 1952

2,597,742

UNITED STATES PATENT OFFICE 2,597,742

ROTARY HOE WHEEL

Thomas R. Mahoney, Greenville, Ohio

Application July 19, 1948, Serial No. 39,500

7 Claims. (Cl. 97—212)

My invention relates to rotary hoes for agricultural machines or the like such as cultivators and having peripheral teeth adapted to dig into the soil in cultivating along rows of growing plants and an object thereof is to provide a simple efficient and strong wheel assembly including disks or spiders which include a hub or bearing sleeve which permits the device to be mounted on and revolve with or around a shaft and portion mounting for the teeth so that the latter will dig into the soil instead of picking or striking the same so as to transmit the shocks to the hub and hence to the shaft on which the hoe is mounted to be driven thereby relieving the disks of strains and stresses.

Another object of the invention is to provide a rotary hoe of the toothed type in the form of a wheel having opposed right and left hand disks or spiders made up of cast iron or pressed steel plates with oppositely extending bearing hubs to rotatably support the hoe on an axle or shaft and formed with opposed rib-producing recesses adapted to strengthen the plates and extending through the peripheral edges thereof so that when two opposed disks are placed together they form pockets to receive the hoe teeth which are riveted or bolted through the teeth and disks to securely hold them in position and resist shocks when in use.

The invention also consists in arranging the pockets in position tangentially to the hub and axle in the direction of rotation of the hoe and curvature of the teeth when in use to dig up the soil and operate in a digging manner rather than with a picking or striking action so that a maximum of shock will be transmitted to the axle in the most direct manner possible.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a side elevation partly broken away of a rotary hoe embodying my invention;

Figures 2, 3 and 4 are sectional views taken on the lines 2—2, 3—3, and 4—4 of Figure 1;

Figure 5 is a side elevation partly broken away of another form of my invention;

Figures 6 and 7 are sectional views taken on the lines 6—6 and 7—7 of Figure 5.

Referring to the drawings in detail and especially to Figures 1 to 4 inclusive, the rotary hoe or wheel body is designated generally at 10 and comprises reversely formed right and left hand circular plates or disks 11 and 12 in the form of spiders of cast metal such as iron but may be of forged or pressed steel and especially the latter. The plates or disks 11 and 12 are provided with aligned or mating flat inner face portions 13 disclosed in contact and the disks or plates are formed with or include similar cylindrical tubular hubs or bearing sleeves 14 and 15 extending outwardly in opposite directions within which is a babbitt or alloy bearing sleeve 16 to receive an axle or shaft for rotation. The plates or disks may, if desired, be formed with a series of successive scallops or arcuate concavities 17, nine or otherwise in number.

At the outside, each plate is formed with outwardly divergent laterally extending tapered reinforcing rectilinear spiders or ribs 18 extending from the hub in a spiral direction tangentially to the periphery of the hub and to the peripheries of the plates or disks. These ribs are located directly opposite each other and extend into the concavities 17 approximately one-third of the distance from one end thereof. Outwardly divergent and lateral offset rib forming portions 19 also extend from the hub to the periphery divergent from the ribs 18 and tangentially from the hub at one side of the ribs to the periphery at the central portions of the concavities 17 and substantially one-third the way across the latter. These offset portions produce coacting and mating interior tooth receiving recesses 20 of substantially rectangular cross section forming sockets or pockets in which the hoe teeth are designed to be secured when the disks are placed together and assembled. The pockets terminate at the hubs 14 and 15 between adjacent pairs of ribs 18 and taper inwardly at their closed inner ends with portions 21 therebetween in contact at each side of the pockets and at the apices of the concavities between the pockets and the ribs 18. With the recesses and pockets located substantially centrally between or spaced from the ends of the concavities 17 at their outer ends and the ribs 18 at the forward side of each with respect to the direction of rotation of the hoe in use, a maximum of radial strain is directed toward the hub to efficiently absorb shocks.

The hoe teeth are designated at 22 and have shanks 23 of rectangular cross sections fitted in all of the pockets formed by the coacting or registering recesses 20. These teeth are preferably of dropped forged steel and the shanks 23 thereof are flat so as to fit the pockets. The teeth have transversely tapered or mitered inner ends 24 to fit the tapered inner ends of the pockets and at their outer ends project from the periphery of the wheel where they are provided with curved and tapered forwardly directed outer ends 25 forming digging points in connection with flat tapered side projections 26 at the front faces of the teeth on opposite sides thereof to properly dig into, lift, break up and loosen the soil.

The teeth are secured in the pockets by suitable fastening means such as rivets or bolts shown as button-headed rivets 27 disposed through registering holes at the shanks 23 of the teeth 22 and walls of the outwardly offset pocket forming portions 19.

In Figures 5, 6 and 7 of the drawings, a slightly different form of rotary hoe is illustrated and the construction and relation of the parts is substantially the same as that described in connection with Figures 1 to 4 inclusive with corresponding parts similarly numbered except that instead of plates 11 and 12, pressed steel circular plates or disks 11' and 12' are used. These plates have circular peripheral edges or rims 17' and are formed with rib-producing aligned outwardly divergent and radially offset portions 19' forming coacting interior pocket forming recesses 20' for similarly receiving and securing corresponding teeth 22' therein with flat contacting portions 21' therebetween. All corresponding or like parts are similarly numbered and primed. However, instead of the hubs of the bearing portions 14 and 15, plates or disks 11' and 12' are formed with outwardly oppositely extending spaced conical central portions 28 and 29 formed with cylindrical tubular hubs or bearing sleeves 14' and 15' at their outer ends within which a babbitt or alloy bearing sleeve 16' is disposed to receive an axle or shaft for rotation. This construction is lighter and less expensive for rotary hoes adapted to be used in connection with light or hand hoe machines and to be especially effective and stand up better in lighter, softer soils such as sandy loams due to the decreased strains and stresses thereon. The teeth 22' are secured in position in the pockets formed by the recesses of the offset portions 19' by fastenings 27' the same as previously described.

What is claimed is:

1. A rotary hoe comprising opposed right and left hand plates having hub producing tubular portions and outwardly offset tooth receiving pockets forming ribs merging into said tubular portions, teeth fitting said pockets and means to secure said plates together through said teeth.

2. A rotary hoe comprising opposed annular plates having hub portions and outwardly offset mating portions with interior recesses forming tooth receiving pockets extending spirally from the hub portions to the peripheries of the plates, strengthening ribs merging into said hub portions, teeth having shanks fitting said pockets and fastening means through the plates and teeth to secure the same together.

3. A rotary hoe comprising opposed right and left hand plates having hub portions and outwardly offset mating portions with interior recesses forming pockets extending tangentially of the hub portions and merging with the latter, strengthening ribs merging into said hub portion, teeth having flat shanks fitting said pockets and means to secure said plates and teeth together.

4. A rotary hoe comprising opposed annular plates having tubular hub portions extending outwardly and outwardly offset mating portions and producing tooth receiving pockets extending tangentially from the hub portions to the peripheries of the plates, teeth having shanks fitting said pockets, said pockets having tapered inner ends extending substantially radially and abutting against the leading edge of the adjacent pocket, the inner ends of the shanks being tapered to fit said inner ends, and fastening means extending through the plates and teeth to secure the plates together and the teeth in the pockets.

5. A rotary hoe comprising opposed annular plates with outwardly offset mating portions with interior recesses forming tooth receiving pockets and ribs at the outside, hub portions projecting outwardly from the plates, the leading edges of said offset portions merging tangentially with said hub portions, a tubular bearing in said hub portions, said plates having outwardly projecting ribs along the leading edges of said pockets and contacting portions between the pockets, teeth having shanks fitting said pockets and extending tangentially of the hub portions, and means extending through said plates and teeth to secure said plates together.

6. A rotary hoe comprising opposed cast metal plates having oppositely extending hub portions, a tubular bearing in said hub portions, said plates having outwardly offset portions with interior recesses forming tooth receiving pockets extending tangentially of the hub portions, outwardly extending ribs formed along the leading edges of said offset portions and connected at one end to said hub, teeth having flat shanks fitting said pockets, said pockets having tapered inner ends and the inner ends of the shanks being tapered to fit the inner ends of the pockets, and means extending through the plates and teeth to secure the same together.

7. A rotary hoe comprising pressed metal disks having laterally curved hub portions, a bearing sleeve in said hub portions, outwardly offset portions extending tangentially of the hub portions and merging with the latter to provide interior mating recesses forming flat teeth receiving pockets and contacting portions between said offset portions, teeth having flat shanks fitting said pockets and extending outwardly beyond the peripheries of the disks, and fastening means extending through the disks and teeth to clamp the same together.

THOMAS R. MAHONEY.

REFERENCES CITED

The following references are of record in the file of this patent:

UNITED STATES PATENTS

| Number | Name | Date |
|---|---|---|
| 1,661,692 | Everist | Mar. 6, 1928 |
| 2,012,434 | Pedersen | Aug. 27, 1935 |
| 2,388,553 | Kraus | Nov. 6, 1945 |
| 2,419,717 | Karl | Apr. 29, 1947 |
| 2,428,973 | Kelsey | Oct. 14, 1947 |